US008653712B2

(12) United States Patent
Hasegawa et al.

(10) Patent No.: US 8,653,712 B2
(45) Date of Patent: Feb. 18, 2014

(54) SUPERCONDUCTING COIL AND SUPERCONDUCTING ROTATING MACHINE USING THE SAME

(75) Inventors: Manabu Hasegawa, Mito (JP); Tsuyoshi Wakuda, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 223 days.

(21) Appl. No.: 13/190,630

(22) Filed: Jul. 26, 2011

(65) Prior Publication Data
US 2012/0019090 A1 Jan. 26, 2012

(30) Foreign Application Priority Data

Jul. 26, 2010 (JP) ................................ 2010-166630

(51) Int. Cl.
*H02K 1/00* (2006.01)
(52) U.S. Cl.
USPC .......................................... 310/194; 310/52
(58) Field of Classification Search
USPC ............... 310/43, 52, 54, 194, 179–180, 184, 310/185, 198, 222
See application file for complete search history.

(56) References Cited

U.S. PATENT DOCUMENTS

| 5,212,416 | A | * | 5/1993 | Shimizu et al. | ............ | 310/12.23 |
| 5,973,423 | A | * | 10/1999 | Hazelton et al. | ........... | 310/12.02 |
| 6,759,781 | B1 | * | 7/2004 | Bushko et al. | ................ | 310/208 |
| 7,119,644 | B2 | * | 10/2006 | Snitchler et al. | .............. | 335/216 |
| 2003/0137208 | A1 | * | 7/2003 | York et al. | ..................... | 310/194 |
| 2008/0061651 | A1 | * | 3/2008 | York | .............................. | 310/194 |
| 2009/0051241 | A1 | * | 2/2009 | Wiezoreck | ..................... | 310/195 |
| 2010/0133944 | A1 | * | 6/2010 | Fujisawa et al. | .............. | 310/195 |

FOREIGN PATENT DOCUMENTS

| JP | 08-236341 | 9/1996 |
| JP | 2005-176578 | 6/2005 |
| JP | 2009-049040 | 3/2009 |

OTHER PUBLICATIONS

Machine translation of Oohashi; Jp 2005-176578 A.*

* cited by examiner

*Primary Examiner* — Nguyen N Hanh
(74) *Attorney, Agent, or Firm* — Antonelli, Terry, Stout & Kraus, LLP.

(57) ABSTRACT

A superconducting coil whose shape can be modified after it is shaped and a superconducting rotating machine with the superconducting coil are provided. The superconducting coil has an feature that the superconducting coil 1 comprising a superconducting material wire 5 coated with an insulation material and a coil frame 4 on which the superconducting material wire 5 is wound, the coil frame 4 comprising a first member 2 being a thin plate in a circular ring shape and a second member 3 jointed with an inner periphery portion of the first member 2, the first member inner periphery portion extending from the jointed portion toward an outer periphery of the first member, wherein the superconducting material wire 5 is wound between the first member 2 and the second member 3, which constitute the coil frame 4.

14 Claims, 16 Drawing Sheets

SUPERCONDUCTING COIL AND SUPERCONDUCTING ROTATING MACHINE USING THE SAME

CROSS REFERENCE TO RELATED ART

The present patent application claims the benefit under 35 U.S.C. 119 of Japanese Patent Application No. 2010-166630 filed on Jul. 26, 2010, the disclosure of which is incorporated into this patent application by reference.

BACKGROUND OF THE INVENTION

1. Field of the Invention

The present invention relates to a superconducting coil and a superconducting rotating machine, especially the superconducting coil to be used for a stator coil of the superconducting rotating machine and the superconducting rotating machine utilizing the stator.

2. Description of Related Art

The superconducting rotating machine utilizing the superconducting coil of a superconducting material has been known as enabling a rotating machine that is smaller and lighter.

JP2005-176578A discloses a superconducting motor (superconducting rotating machine) with a stator coil of a superconducting coil on a stator. The superconducting coil (stator coil) disclosed in JP2005-176578A consists of a tape of a superconducting material that is coiled in a race-track shape with linear portions and curved portions. In each turn of this superconducting coil, the linear portion of the tape is on the same plane as the curved portion of the tape.

JPH08-236341A discloses a saddle shape superconducting member which has a linear portion of a stator coil is not disposed on the same plane as a curved portion of the stator coil, which is intended to have the linear portion of the stator coil come close to a rotor and not to have the curved portion of the stator abut on stator. JP2009-049040A discloses a coil frame on which a tape of a superconducting material is coiled.

Looking to any of JP2005-176578A, JPH08-236341A and JP2009-0490040A, a shape of a stator tooth, on which a shaped coil is attached, is restricted because there is no way to change a coil shape after the coil is shaped. For example, if the shape of a stator tooth is homogeneous in the radius direction of the super conducting rotating machine like the superconducting motor (superconducting rotating machine) shown in FIG. 2 of JP2005-176578, any of the superconducting coils disclosed in JP2005-176578A, JPH08-236341A and JP2009-049040A can be attached onto the stator tooth without deforming the shape of the superconducting coil.

However if the width of a stator tooth varies in the radius direction of the superconducting rotating machine, it may be difficult to attach any of the superconducting coils disclosed in JP2005-176578A, JPH08-236341A and JP2009-0490040A onto the stator tooth. For instance, if the width of a portion of a stator tooth becomes larger as the portion is farther apart from the center of a rotation axis of a rotor in the radius direction of the superconducting rotating machine, the superconducting coil has to be attached onto the stator tooth while enlarging the coil width and it is difficult to attach any of the superconducting coils disclosed in JP2005-176578A, JPH08-236341A and JP2009-0490040A onto the stator tooth because the shape of any of these superconducting coils can not be changed.

SUMMARY OF THE INVENTION

The present invention is intended to provide a superconducting coil whose coil shape can be changed after the coil is shaped and a superconducting rotating machine using the superconducting coil.

In order to realize such a superconducting coil, a superconducting coil of the present invention has a feature of the superconducting coil comprising a superconducting material wire coated with an insulation material and a coil frame on which the superconducting wire is wound, the coil frame comprising a first member being a thin plate in a circular ring shape and a second member jointed with an inner periphery portion of the first member, the first member inner periphery portion extending from the jointed portion toward an outer periphery of the first member, wherein the superconducting material wire is wound between the first member and the second member, which constitute the coil frame.

A superconducting rotating machine of the present invention has a feature that the superconducting rotating machine comprises a stator having a plurality of superconducting coils as described above and a stator frame and a rotor having a magnetic material or a conductor, wherein the plurality of superconducting coils are disposed on an inner circumference of the stator frame as viewed in a direction of a rotation axis of the rotor.

Using the superconducting coil and the superconducting rotating machine with the coil according to the present invention, the superconducting coil whose shape can be modified after it is shaped and the superconducting rotating machine with the superconducting coil are provided, and the resultant super conducting coil can be attached on the stator tooth regardless of the shape of the stator tooth.

DETAILED DESCRIPTION OF THE EMBODIMENTS

Embodiments to practice the present invention are explained in detail with reference to attached drawings hereinafter. An identical sign is put on any of common portions or parts throughout the drawings.

First Embodiment

Figure 1A:
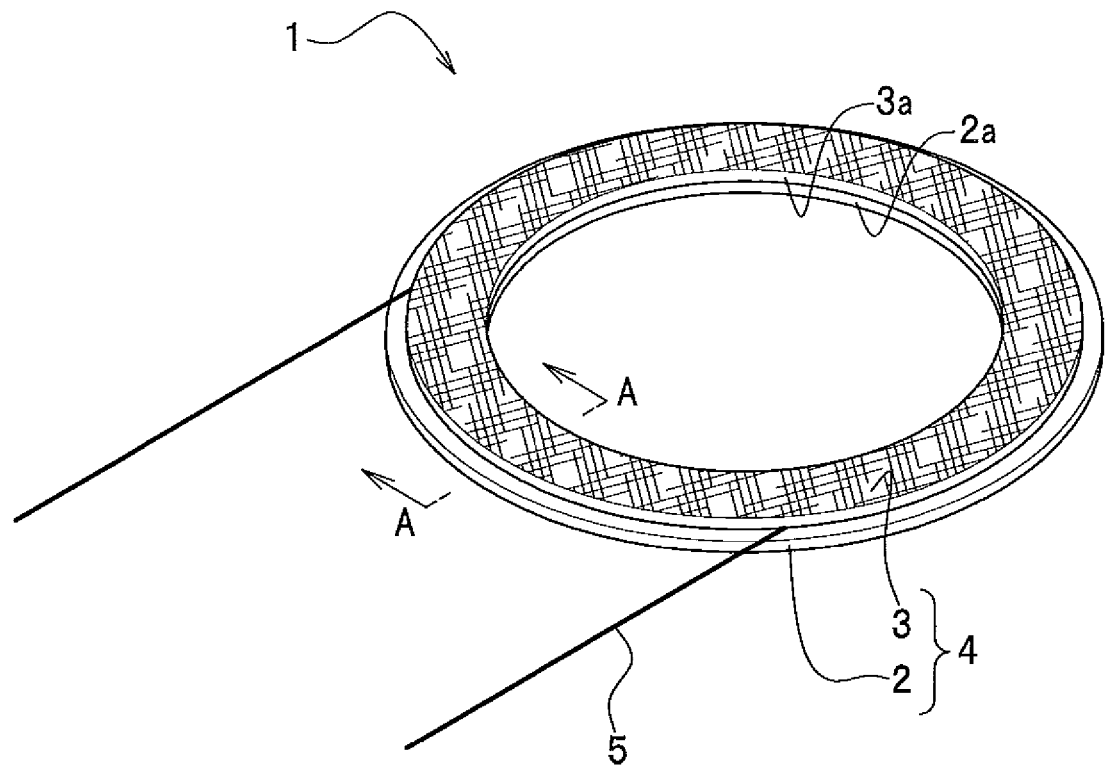
FIGS. 1A and 1B are views of a superconducting coil for the first embodiment with FIG. 1A being a perspective view and FIG. 1B being a cross sectional view in the direction of arrows indicated in FIG. 1A when the coil is cut through the A-A line in FIG. 1A.
Figure 1B:
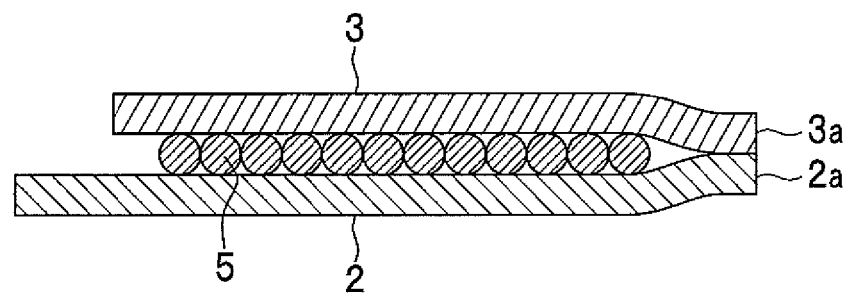

FIGS. 1A and 1B are views of a superconducting coil for the first embodiment with FIG. 1A being a perspective view and FIG. 1B being a cross sectional view in the direction of arrows indicated in FIG. 1A when the coil is cut along the A-A line in FIG. 1A.

As shown in FIG. 1A, a superconducting coil 1 comprises a coil frame 4, which is constituted by a first support member (first member) 2 and a second support member (second member) 3, and a superconducting material wire 5 to be coiled on the coil frame 4.

<Coil Frame>

Figure 13:
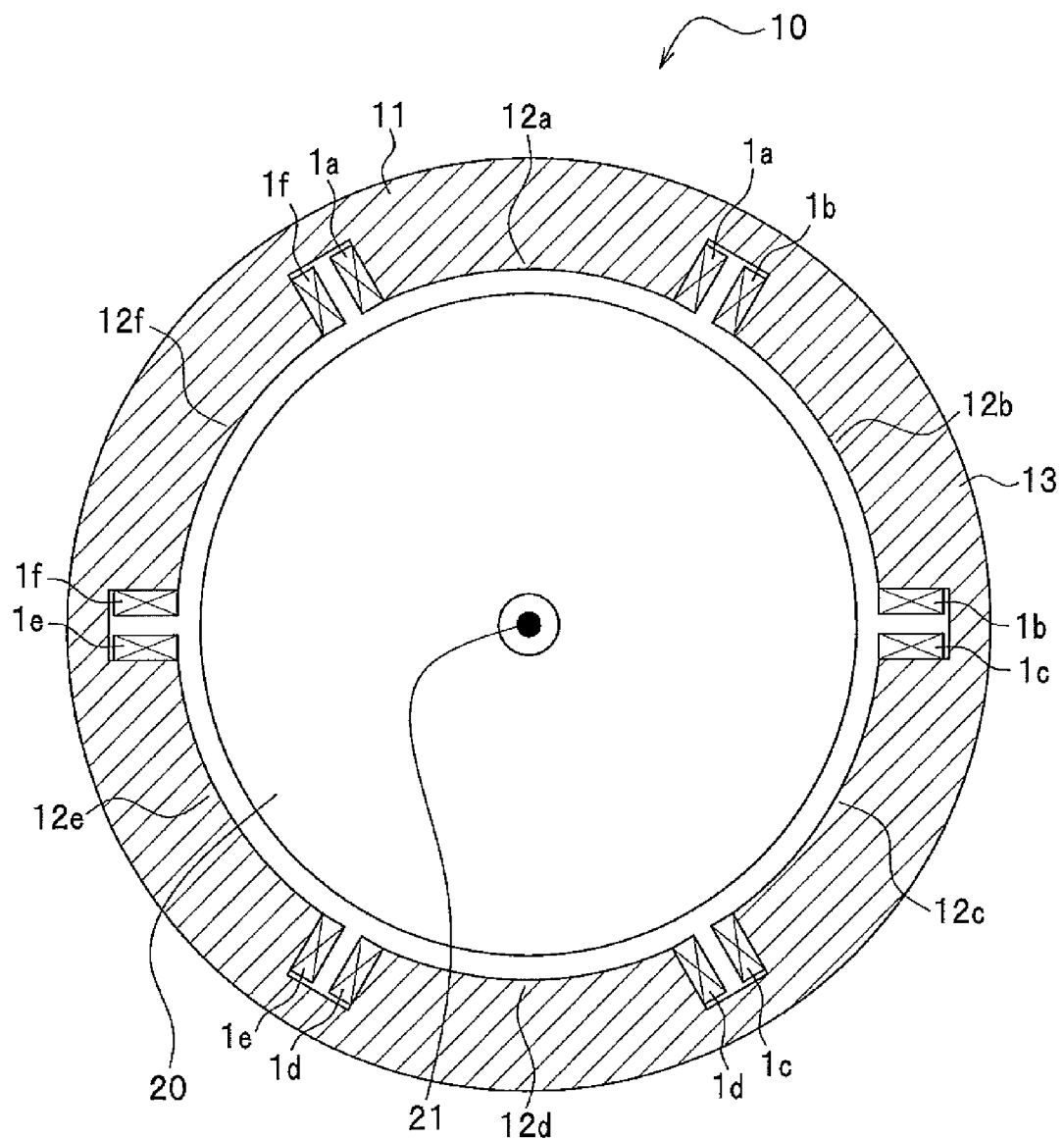
FIG. 13 is a cross sectional view of a superconducting rotating machine as viewed in the direction of a rotation axis of a rotor.

The first support member 2 is a ring shaped thin plate and has an opening portion 2a through which the superconducting coil 1 is installed on the tooth 12 of a superconducting rotating machine 10 (See FIG. 13). The opening portion 2a includes an inner periphery of the first support member 2 that is in a ring shape.

The second support member 3 is also a ring shaped thin plate, has an opening portion 3a whose diameter is substantially as large as the opening portion 2a and is aligned with the first support member 2 when it is overlaid on the first support member 2. The opening portion 3a has the same function as the opening 2a. As is shown in FIG. 1B, the opening portion 3a of the second support member 3 is jointed with the opening portion 2a of the first support member 2. The second support member 3 extends from the opening portion 3a to its outer periphery which is left free. Thus a combination of the first support member 2 and the second support member 3 constitutes the coil frame 4.

<Superconducting Material Wire>

The super conducting material wire 5 is a round shape wire made of, for example, a super conducting material of magnesium diboride, and is coiled on the coil frame 4 between the first support member 2 and the second support member 3 as is shown in FIG. 1B. A method for producing a superconducting wire of magnesium diboride is explained in, for example, JP2009-134969A and not explained in this specification.

The superconducting material wire 5 is coated with an insulation material and coiled on the coil frame 4 in order to prevent a short-circuited electrical current from flowing to the coil frame 4 and within the coiled superconducting material wire 5. Such an insulation material as a glass fiber having an ability to withstand high temperatures is used for coating the superconducting material wire 5, because the superconducting material wire 5 is heat-treated after coiled (See the step S104 in FIG. 2) as is explained later.

<Production Method of Superconducting Coil>

Figure 2:
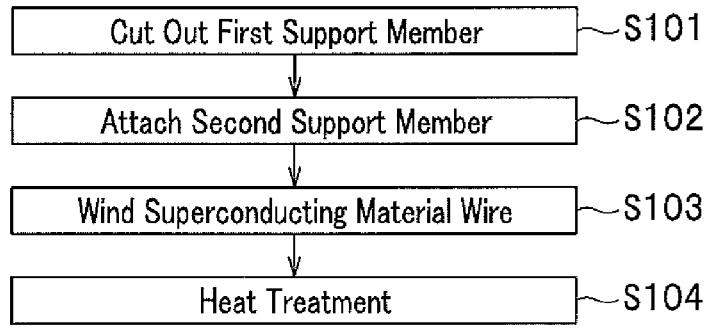
FIG. 2 is a flow chart showing the production method of the superconducting coil in accordance with the first embodiment.
Figure 3A:
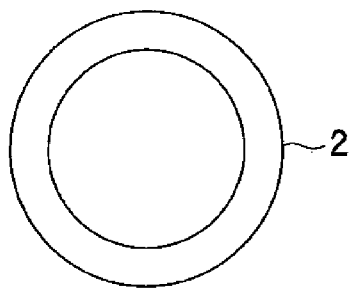
FIGS. 3A, 3B and 3C are plan views of intermediate products each of which is produced after one or more production steps of the superconducting coil in accordance with the first embodiment.
Figure 3B:
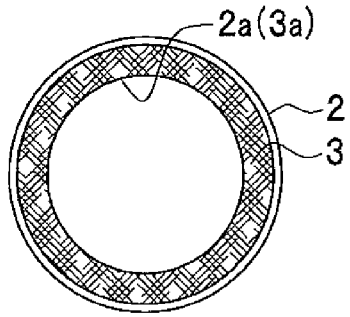
Figure 3C:
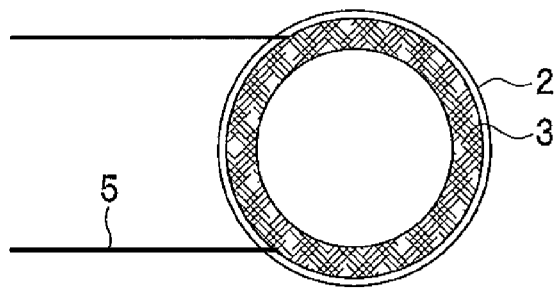

Next, the production method for the superconducting coil for the first embodiment is explained with reference to FIGS. 2, 3A, 3B and 3C. FIG. 2 is a flow chart showing the production method of the superconducting coil in accordance with the first embodiment. FIGS. 3A, 3B and 3C are plan views of intermediate products each of which is produced after one or more production steps of the superconducting coil in accordance with the first embodiment.

At step S101, the first support member 2 is cut out from a metal plate as shown in FIG. 3A. The second support member is cut out from a metal plate as well in the similar way. A preferable material for the first support member 2 and the second support member 3 is a stainless steel because the stainless steel has good corrosion resistance and good heat resistance and is relatively easily bent. The metal plate is preferably 0.5 mm thick or thinner to facilitate the bending work.

At step S102, the second support member 3 is attached to the first support member 2 as shown in FIG. 3B. As is shown in FIG. 1B, only the opening portions 2a and 3a (inner periphery portion) of the first support member 2 and the second support member 3 are jointed with each other, while both outer periphery portions of the first support member 2 and the second support member 3 are left free. In this way, the coil frame 4 for the superconducting coil 1 is made. There may be several ways for jointing the first support member 2 with the second support member 3 such as adhering, welding and brazing. The whole inner periphery portions of the first support member 2 and the second support member 3 may be jointed or inner periphery portions of the first support member 2 and the second support member 3 distributed at an appropriate interval.

At step S103, the superconducting material wire 5 is wound about the coil frame 4 that is made at step S102 as shown in FIG. 3C. Before winding, the first support member 2 and the second support member 3 are deformed in such a way that a space is formed between the first support member 2 and the second support member 3 and runs from the outer periphery portions to the bonding portion of the first support member 2 and the second support member 3. Then the superconducting material wire 5 is wound around on the bonded portion as a winding axis between the first support member 2 and the second support member 3. The superconducting material wire 5 that is wound on the coil frame 4 is a hollow material wire in a tube shape that is produced on in-situ powder-intube method (hereinafter referred to as "in-situ PIT method") and has magnesium powder and boron powder filled in the inner space and encapsulated inside. This wound superconducting material wire 5 becomes a superconducting wire after heat treated in which the magnesium (Mg) powder chemically reacts with the boron (B) powder and magnesium diboride ($MgB_2$) that is a superconducting material is produced in the wound wire.

Since the superconducting material wire 5 before heat treated as explained above is wound about the coil frame 4, the superconducting material in the superconducting material wire 5 is prevented from breaking due to winding. It should be understood that the hollow superconducting material wire 5 having the magnesium powder and the boron powder filled in the inner space and encapsulated thereinside may be drawn to be thinner while it is undergoing an intermediate heat treatment and wound about the coil frame 4.

At step S104, each coil frame 4 about which is wound the superconducting material wire 5 produced on the in-situ PIT method is put into in a furnace and heat treated (final heat treatment). This heat treatment is performed between 550° C. and 750° C. During the heat treatment, the magnesium powder and the boron powder, which are encapsulated, chemically react with each other, which results in producing magnesium diboride that is a superconducting material. It is preferable that the produced magnesium boride ($MgB_2$) wire be impregnated with resin and fixed to prevent quench due to the superconducting wire being moved. This resin used for fixing the superconducting wire preferably includes fillers to make the thermal conductivity higher to enhance cooling efficiency.

As has been explained, the superconducting coil 1 according to the first embodiment shown in FIG. 1 is produced.

<Effect>

Now the effect of the superconducting coil 1 according to this embodiment is explained, making a comparison between the production method of the conventional superconducting coil and the production method of the superconducting coil 1 for the present embodiment.

R&W method (react and wind method), according to which the heat treated superconducting wire is wound about stator tooth, and W&R (Wind and method, according to which the superconducting wire is heat treated after wound about stator tooth, have been known as conventional production methods. However if the superconducting wire produced on either of these conventionally known production methods is applied to a superconducting rotating machine, there come out the following problems.

If R&W method is used, the superconducting wire becomes hardened after heat treated and does not have good workability with its critical fracture stress relatively low, the superconducting wire after heat treated could break or deteriorate when it is wound about the stator tooth. Therefore, the superconducting wire produced on R&W method can not be wound about the stator tooth with a large curvature.

If R&W method is used, the stator tooth about which the superconducting wire before heat treated is wound is put in a furnace to be heat treated. Obviously a large capacity furnace is needed to put the whole stator tooth. Moreover because the stator tooth is heat treated as well, the physical property of the stator tooth could change, which results in the superconducting rotating machine having performance degraded.

On the other hand, if the production method on the present embodiment is used, the superconducting material wire 5 is produced on in-situ PIT method and heat treated after the superconducting material wire 5 is wound about the coil frame 4. Accordingly the superconducting material in the superconducting wire 5 is prevented from breaking. Moreover there is no need for a large furnace, the physical property of the stator tooth (iron core) does not change because the stator is not heat treated and the performance of the superconducting rotating machine does not degrade.

Furthermore, the coil frame 4 is deformable because it is made of the first support member 2 and the second support member 3, both of which are in a thin plate shape, and relatively easily attached onto the stator tooth (See FIG. 13) of the superconducting rotating machine 10.

The superconducting coil for the first embodiment may not be limited to what is described above and be modified within the scope of the present invention. Next modified examples of the first embodiment are explained.

First Modified Example

Figure 4:
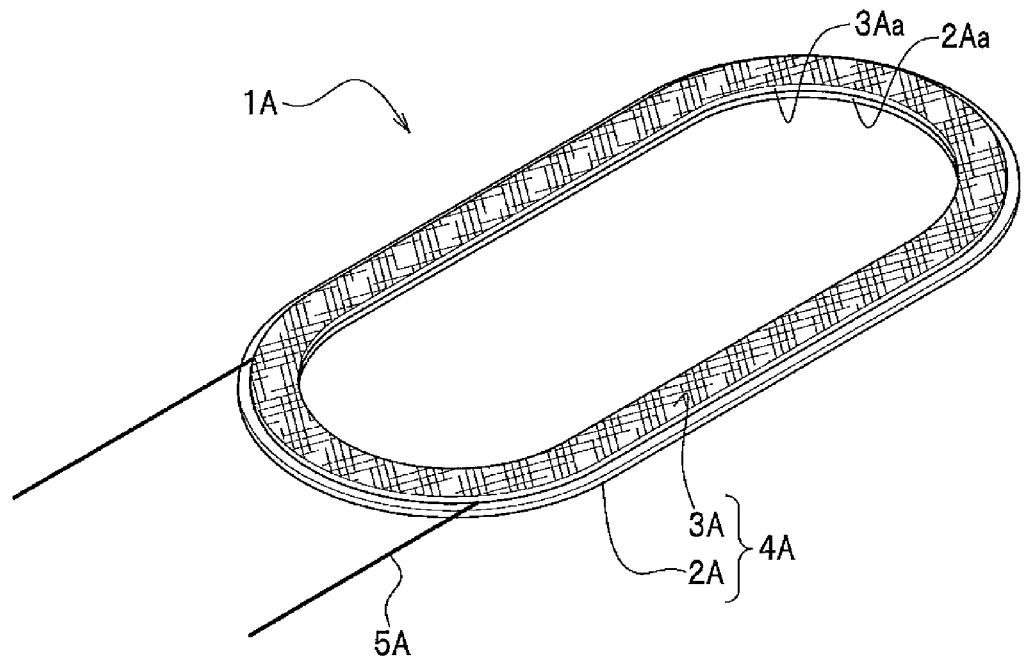
FIG. 4 is a perspective view of a superconducting coil for a first modified example of the first embodiment.

FIG. 4 is a perspective view of a superconducting coil for a first modified example.

In the superconducting coil 1A for the first modified example as shown in FIG. 4, a first support member 2A having an opening portion 2Aa is in a race track shape having a couple of semicircular portions connected with each other through a couple of linear portions. A second support member 3A having an opening portion 3Aa is in a race track shape as well. This feature is not found in FIG. 1.

The production method of the superconducting coil 1A for the first modified example is the same as the production step flow of the first embodiment described in FIG. 2 except that each of the first support member 2A and the second support member 3A is cut out from a metal plate to be in the race track shape. The explanation of the production method of the superconducting coil 1A is skipped.

According to this modified first example, it is possible to change the length of the coil frame 4A in the rotor rotation axis direction is changed in accordance with and adjusted to the length of the rotor 20 (See FIG. 13) in the direction of the rotor rotation axis 21 (See FIG. 13). The modified first example has this effect in addition to the effects of the first embodiment already explained.

Second Modified Example

Figure 5:
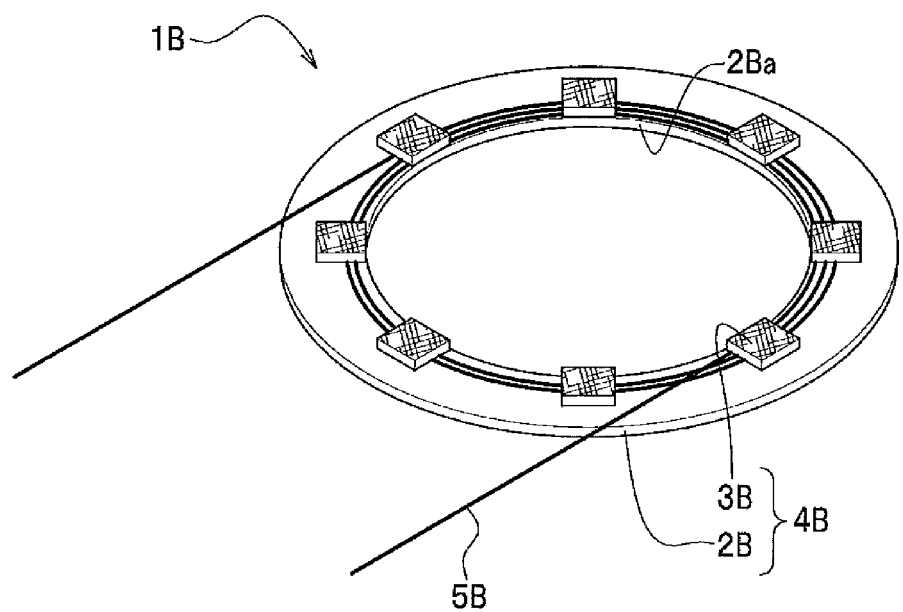
FIG. 5 is a perspective view of a superconducting coil for a second modified example of the first embodiment.

FIG. 5 is a perspective view of a superconducting coil for a second modified example.

In the superconducting coil 1b for the second modified example as shown in FIG. 5, the second support member 3B is divided into a plurality of support pieces and these support pieces are disposed at a predetermined interval on a circumference. The second modified example differs from FIG. 1 in this feature.

Next the production method of the superconducting coil 1B for the second modified example is explained with reference to FIGS. 6, 7A, 7B and 7C. An explanation is skipped on the same production step as included in the production method of the first embodiment (See FIG. 2 and FIG. 3).

Figure 6:
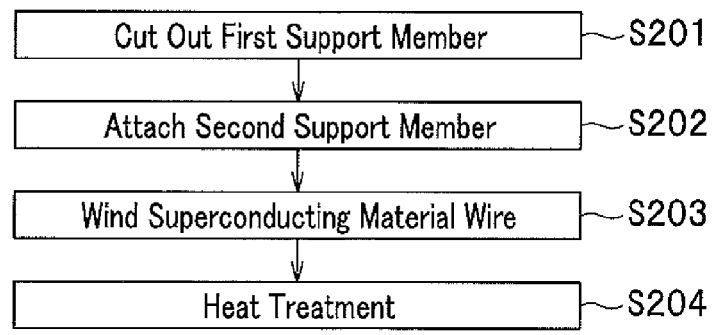
FIG. 6 is a flow chart showing production steps of the superconducting coil for the second modified example.
Figure 7A:
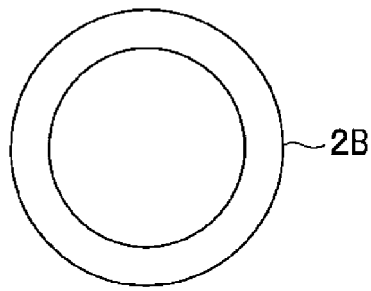
FIGS. 7A, 7B and 7C are plan views of intermediate products each of which is produced after one or more production steps of the superconducting coil for the second modified example.
Figure 7B:
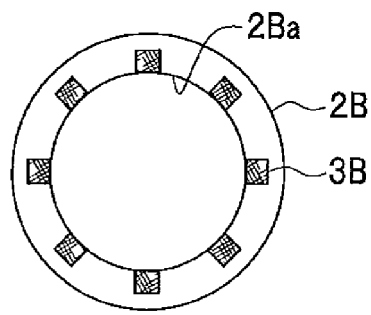
Figure 7C:
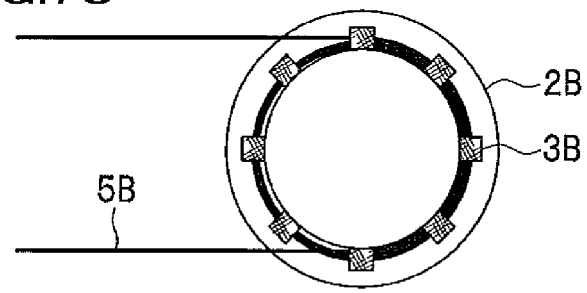

FIG. 6 is a flow chart showing production steps of the superconducting coil for the second modified example. FIGS. 7A, 7B and 7C are plan views of intermediate products each of which is produced after one or more production steps of the superconducting coil for the second modified example.

At step S201, a first support member 2B is cut out from a metal plate as shown in FIG. 7A. Similarly a second support member 3B is cut out from a metal plate.

At step S202, a plurality of support pieces constituting the second support member 3B are disposed at a predetermined interval on a circumference on an opening portion 2Ba of a first support member 2B as is shown in FIG. 7B and each support piece is bonded with an opening portion 2Ba (on the inner opening) of the first support member 2B. The outer circumference portions of the first and the second support members are left unbonded and free. A coil frame 4B of the superconducting coil 1B is produced as explained.

At step S203, a superconducting material wire 5B to be a superconducting wire is wound about the coil frame 4B as is shown in FIG. 7C. At step S204, the whole coil frame 4b with the superconducting material wire 5B is heat treated (final heat treatment).

After the production steps as explained are finished, the superconducting coil 1B for the second modified example as is shown in FIG. 5 is produced.

The second modified example has an effect of reducing a mount of the coil frame material in addition to the effects of the first embodiment already explained.

Third Modified Example

Figure 8:
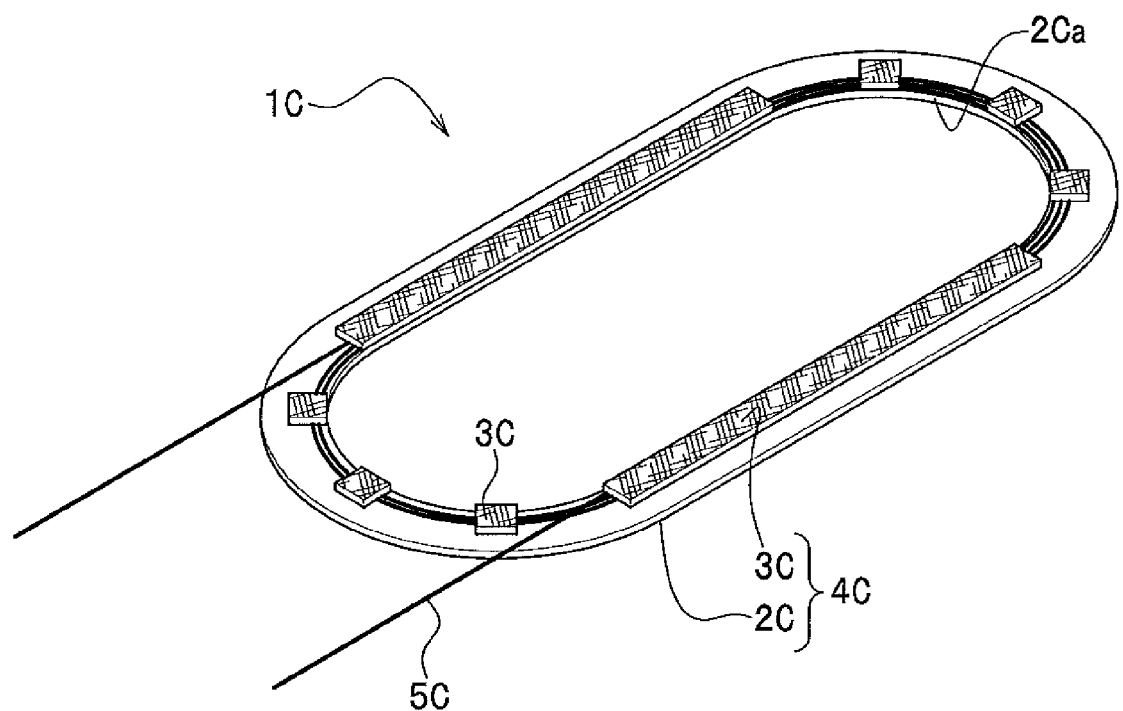
FIG. 8 is a perspective view of a superconducting coil for a third modified example.

FIG. 8 is a perspective view of a superconducting coil for a third modified example.

In the superconducting coil 1C for the third modified example as shown in FIG. 8, a first support member 2C having an opening portion 2Ca is in a race track shape and is constituted by a couple of linear portions and a couple of semicircular portion connected with each other through the linear portions. A second support member is divided into and constituted by a plurality of support pieces. The third modified example differs from FIG. 1 in this feature.

The production method of the third modified example is the same as the production step flow of the second modified example as described in FIG. 6 except that the first support member is cut out from a metal plate to be in a race track shape. The explanation on the production method of the third modified example is skipped.

According to this third modified first example, it is possible to change and adjust the length of the coil frame 4C in the rotor rotation axis direction in accordance with the length of the rotor 20 (See FIG. 13) in the direction of the rotor rotation axis 21 (See FIG. 13). In addition to this effect and the effects of the first embodiment already explained, the third modified example has an effect of reducing an amount of the coil frame material as well.

Fourth Modified Example

Figure 9A:
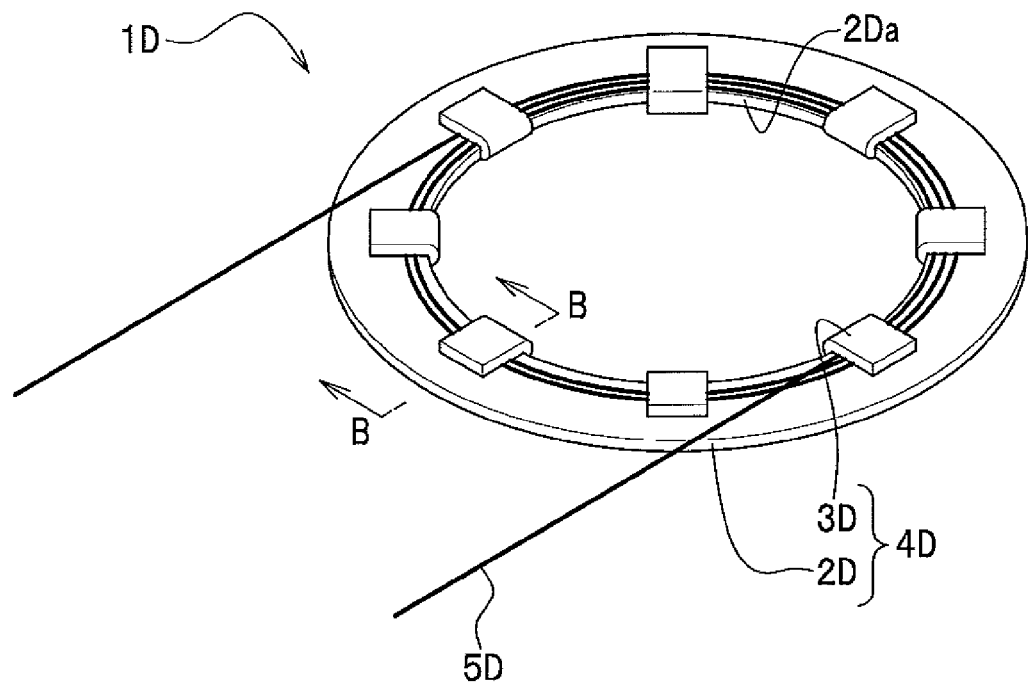
FIGS. 9A and 9B are views of a superconducting coil for a fourth modified example with FIG. 9A being a perspective view and FIG. 9B being a cross sectional view in the direction of arrows indicated in FIG. 9A when the coil is cut along the B-B line in FIG. 9A.
Figure 9B:
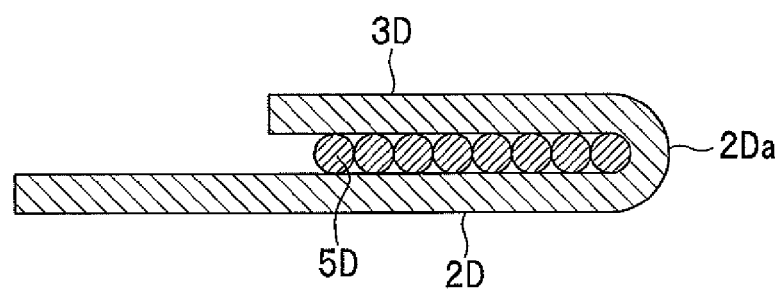

FIGS. 9A and 9B are views of a superconducting coil for a fourth modified example with FIG. 9A being a perspective view and FIG. 9B being a cross sectional view in the direction of arrows indicated in FIG. 9A when the coil is cut along the B-B line in FIG. 9A.

The superconducting coil 1D for the fourth modified example has a feature that a first support member 2D and a second support member 3D constitute a single shaped thin flat plate if the first support member 2D and the second support member 3D are developed with the second support member 3D being straightened. This feature is not found in FIG. 1.

Next, the production method of the superconducting coil 1D for the fourth modified example is explained with reference to FIG. 10 and FIG. 11. An explanation on the same production steps as included in the first embodiment is skipped.

Figure 10:
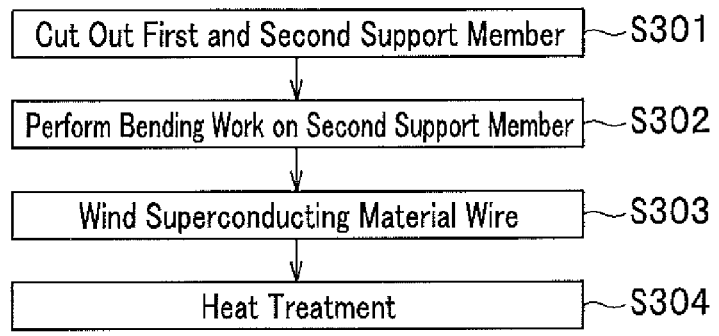
FIG. 10 is a flow chart showing production steps of the superconducting coil for the fourth modified example.
Figure 11A:
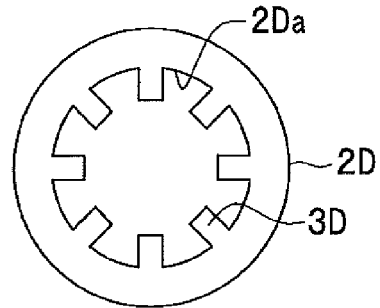
FIGS. 11A, 11B and 11C are plan views of intermediate products each of which is produced after one or more production steps of the superconducting coil for the fourth modified example.
Figure 11B:
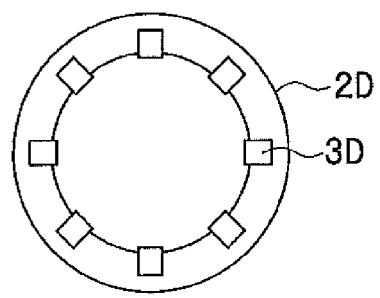
Figure 11C:
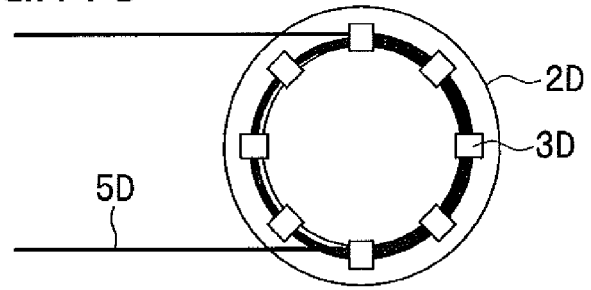

FIG. 10 is a flow chart showing production steps of the superconducting coil for the fourth modified example. FIGS. 11A, 11B and 11C are plan views of intermediate products each of which is produced after one or more production steps of the superconducting coil for the fourth modified example.

At step S301, the first support member 2D and the second support member 3D are integrally cut out from a metal plate as shown in FIG. 11A. The second support member 3D, which is divided into a plurality of support pieces, is formed on an opening portion 2Da of the first support member 2D as shown in FIG. 11A. As is understood from FIG. 11A, the second support member 3D is integrally formed with the first support member 2D and no bonding work is needed.

At step S302, the second support member is bent and folded back in such a way as to have the surface of the second support member 3D face the surface of the first support member 2D as shown in FIG. 11B. Accordingly the coil frame 4D is produced with outer circumference portions of the first and the second support members 2D, 3D left free.

At step S303, the superconducting material wire 5D is wound about the coil frame 4D produced at step S302. At step S304, the whole coil frame 4D is put in a furnace and the superconducting material wire 5D is heat treated (final heat treatment).

The superconducting wire 1D for the fourth modified example as shown in FIG. 9 is produced as explained above.

The fourth modified example has an effect of reducing an amount of a material used for a coil frame in addition to the effect of the superconducting coil 1 for the first embodiment already explained. Moreover since a coil frame is produced by bending work (See step S102 in FIG. 2) without bonding a support member with another to produce a coil frame (See step S302 in FIG. 10), production efficiency for producing the coil frames 4D and the superconducting wires 1D improves significantly.

Fifth Modified Example

Figure 12:
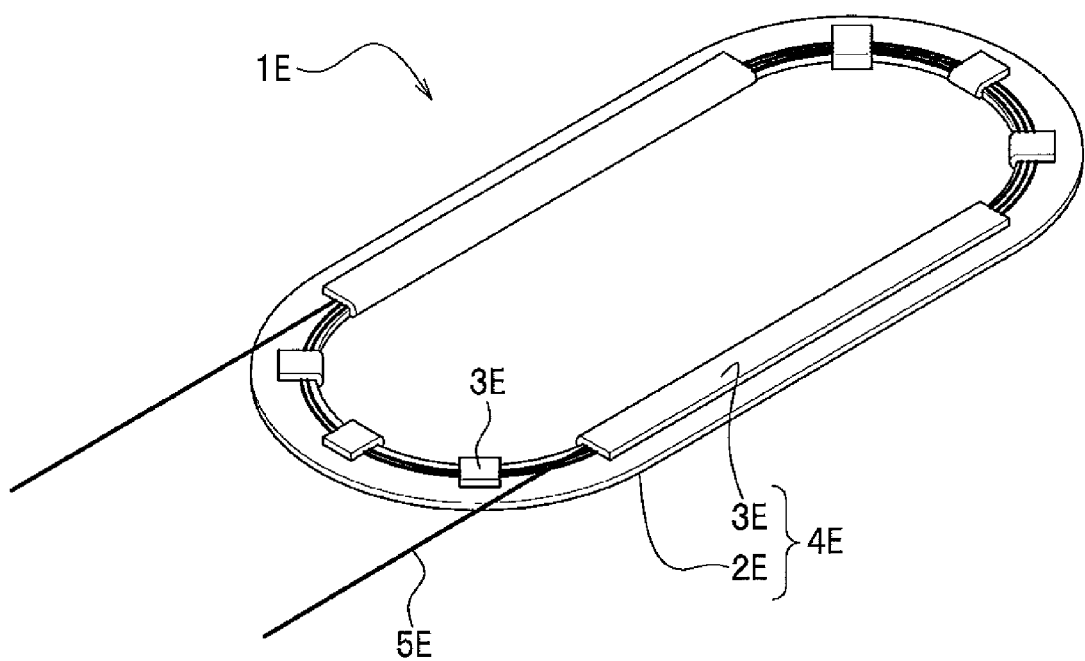
FIG. 12 is a perspective view of a superconducting coil for a fifth modified example.

FIG. 12 is a perspective view of a superconducting coil for a fifth modified example.

The superconducting coil 1E for the fourth modified example has a feature that a first support member 2E and a second support member 3E constitute a single shaped thin flat plate if the first support member 2E and the second support member 3E with the second support member 3E being straightened. The first support member 2E is in a race track shape and has a couple of semicircular portions connected with each other through a couple of linear portions. These features are not found in FIG. 1.

The production method of the superconducting wire 1E for the fifth modified example is the same as the production step flow for the fourth modified example as shown in FIG. 10 except that the first support member 2E cut out from a metal plate is in a race track shape and is not explained here.

According to this fifth modified example, it is possible to change and adjust the length of the coil frame 4E in the rotor rotation axis direction in accordance with the length of each of the teeth 12 of the superconducting rotating machine 10 (See FIG. 13) in the direction of the rotation axis 21 of the rotor 20 (See FIG. 13). In addition to this effect and the effects of the first embodiment already explained, the fifth modified example has as well an effect of reducing an amount of the coil frame material and an effect of improving the production efficiency of coil frames 4E and superconducting coils 1E by producing coil frames by bending work (See step S302 in FIG. 10) instead of bonding support members.

<Superconducting Rotating Machine>

Figure 14:
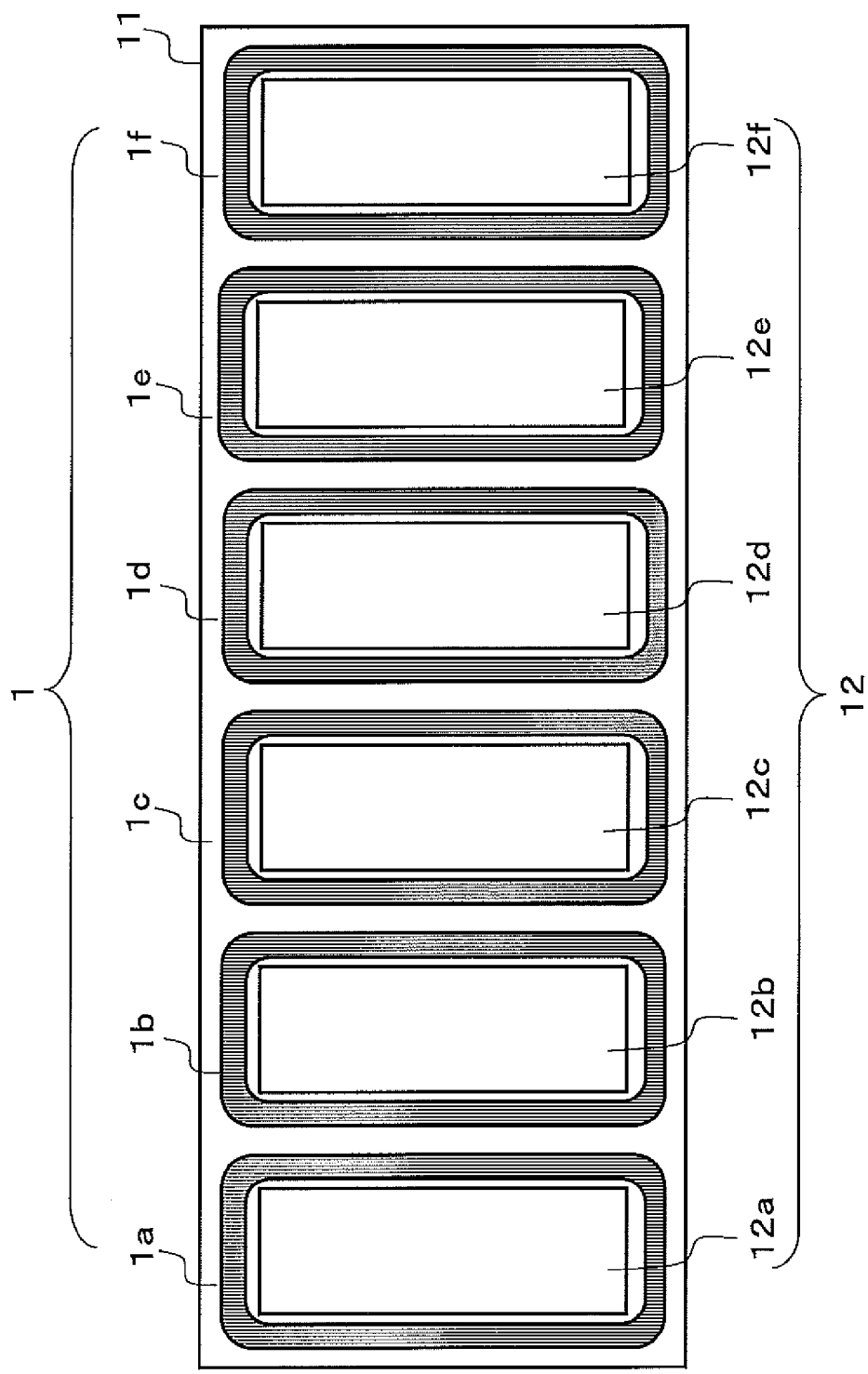
FIG. 14 is a plane view of plural stators disposed linearly.

Next, an explanation is given on a superconducting rotating machine 10 using superconducting coils 1a to 1f for the embodiment of the present invention. FIG. 13 is a cross sectional view of a superconducting rotating machine as viewed in the direction of a rotation axis of a rotor. FIG. 14 is a plane view of plural stators disposed linearly.

The superconducting machine 10 is provided with a rotor 20 rotating about a rotation axis 21 and a stator 11.

The stator 11 is provided with superconducting coils 1a, 1b, 1c, 1d, 1e, 1f and teeth 12a, 12b, 12c, 12d, 12e, 12f. As shown in FIG. 14 the teeth 12a to 12f are disposed on an inner circumference of a stator frame 13. The superconducting coils 1a to 1f are respectively attached to the teeth 12a to 12f. The superconducting coil 1a (1b to 1f) attached to the single tooth 12a (12b to 12f) consists of a plurality of stacked superconducting coils 1 each of which has a coil frame 4 in a thin plate ring shape. These stacked superconducting coils 1 are electrically connected in series or parallel. In FIG. 14, the superconducting coil 1a (1b to 1f) is in a race track shape that is similar to a rectangular shape.

The superconducting rotating machine 10 as shown in FIG. 13 is provided with a three-phase AC power source (not shown). A couple of superconducting coils, which face each other across a rotation axis 21, are connected in series and used for a set of a phase. That is, superconducting coils 1a and 1d are used for U phase, superconducting coils 1b and 1e are used for V phase and superconducting coils 1c and 1f are used for W phase. Thus applying three phase AC power to the superconducting coils 1a to 1f, induced magnetic field that is distributed on the position of the rotor 20 is formed and rotates about the rotation axis 21. If the superconducting coil 1 is in a race track shape (See first, third and fifth modified examples), the rotation axis 21 is disposed in parallel with the linear portions of the superconducting coils 1.

A permanent magnet is used for the rotor 20 if the superconducting coil 10 is a synchronized motor and a squirrel cage conductor is used for the rotor 20 if the superconducting coil 10 is an inductive motor.

The shape of the superconducting coil 1 (1a to 1f) is not limited to a race track shape similar to a rectangular shape and may be any race track shape (See FIGS. 4, 8, 12) or a circular shape (FIGS. 1, 5, 9).

Second Embodiment

Figure 15:
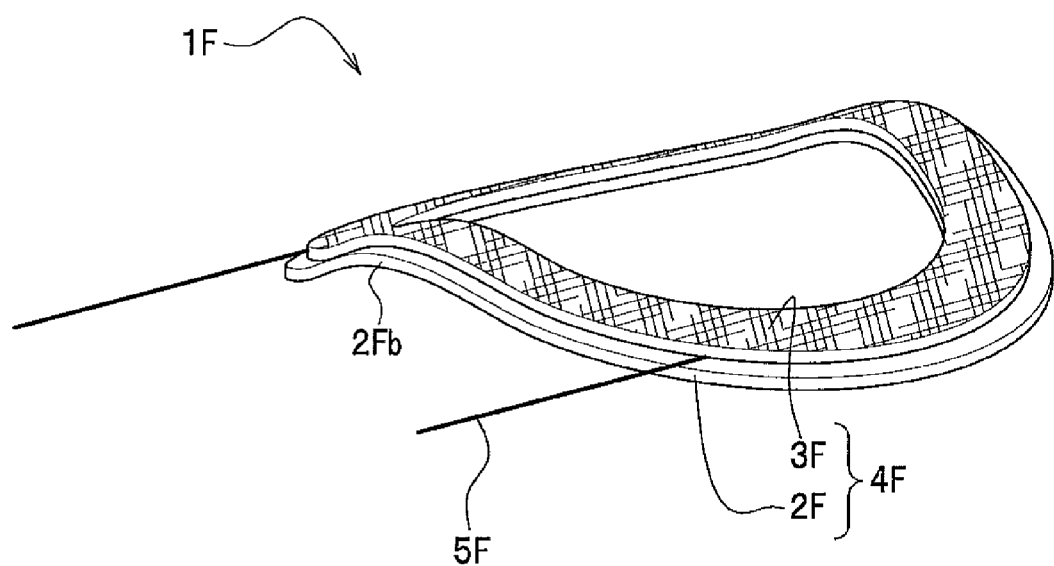
FIG. 15 is a perspective view of a superconducting coil for the second embodiment.

Next, a superconducting coil according to the second embodiment and a superconducting rotating machine using the superconducting coil is explained. FIG. 15 is a perspective view of a superconducting coil for a second embodiment.

As shown in FIG. 15, a superconducting coil 1F is in a saddle shape and includes a support member 2F having a curved plane 2Fb. This feature is not found in FIG. 1.

Then, the production method of the superconducting coil 1F according to the second embodiment is explained with reference to FIG. 16 and FIG. 17A to 17d. An explanation on production steps that are common to the first embodiment (See FIGS. 2 and 3) is skipped.

Figure 16:
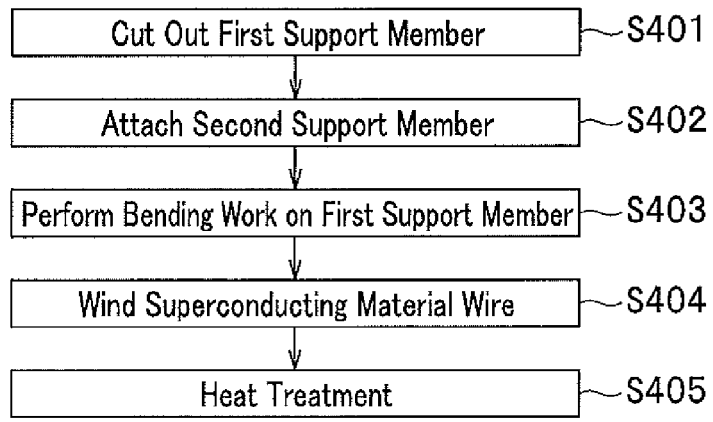
FIG. 16 is a flow chart explaining production steps of the superconducting coil for the second embodiment.

FIG. 16 is a flow chart explaining production steps of the superconducting coil for the second embodiment. FIGS. 17A, 17B, 17C and 17D are plan views of intermediate products each of which produced after one or production steps of the superconducting coil for the second embodiment.

Figure 17A:
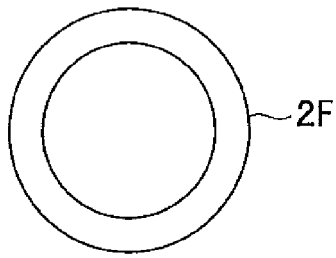
FIGS. 17A, 17B, 17C and 17D are plan views of intermediate products each of which is produced after one or more production steps of the superconducting coil for the second embodiment.
Figure 17B:
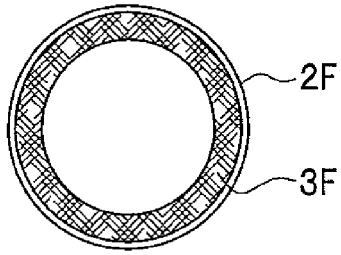
Figure 17C:
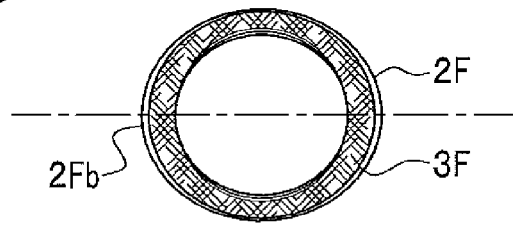
Figure 17D:
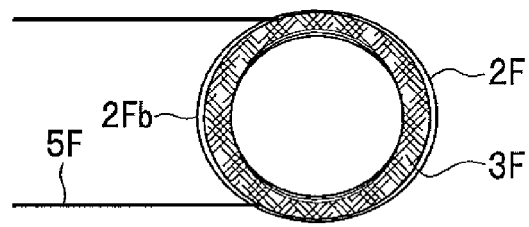

At step S401, the first support member 2F is cut out from a metal plate as shown in FIG. 17A. Similarly a second support member 3F is cut out from a metal plate. At step S402, the first support member 2F and the second support member 3F are bonded as shown in FIG. 17B. At step S403, the first support member 2F is bent to form a curved plane 2Fb that is symmetrical with respect to the dashed line and to be a coil frame 4F in a saddle shape as shown in FIG. 17C. At step S404, a superconducting material wire 5F to be a superconducting wire 5F is wound about the coil frame 4F produced at step S403 as shown in FIG. 17B. At step S405, the whole coil frame 4F is put in a furnace and the superconducting material wire 5F is heat treated (final heat treatment). It does not make a significant difference if the superconducting material wire 5F is wound about the coil frame 4F before the coil frame 4F is bent to be in the saddle shape with the step S404 being carried out ahead of the step S403, because the superconducting property of the superconducting material wire 5F does not deteriorate, as long as the superconducting material wire 5F is bent before the heat treatment in step S405. Thus, the superconducting coil 1F in the saddle shape three-dimensionally curved is produced.

The superconducting coil 1F in the saddle shape for the second embodiment as shown in FIG. 15 is produced as explained above.

Sixth Modified Example

Figure 18:
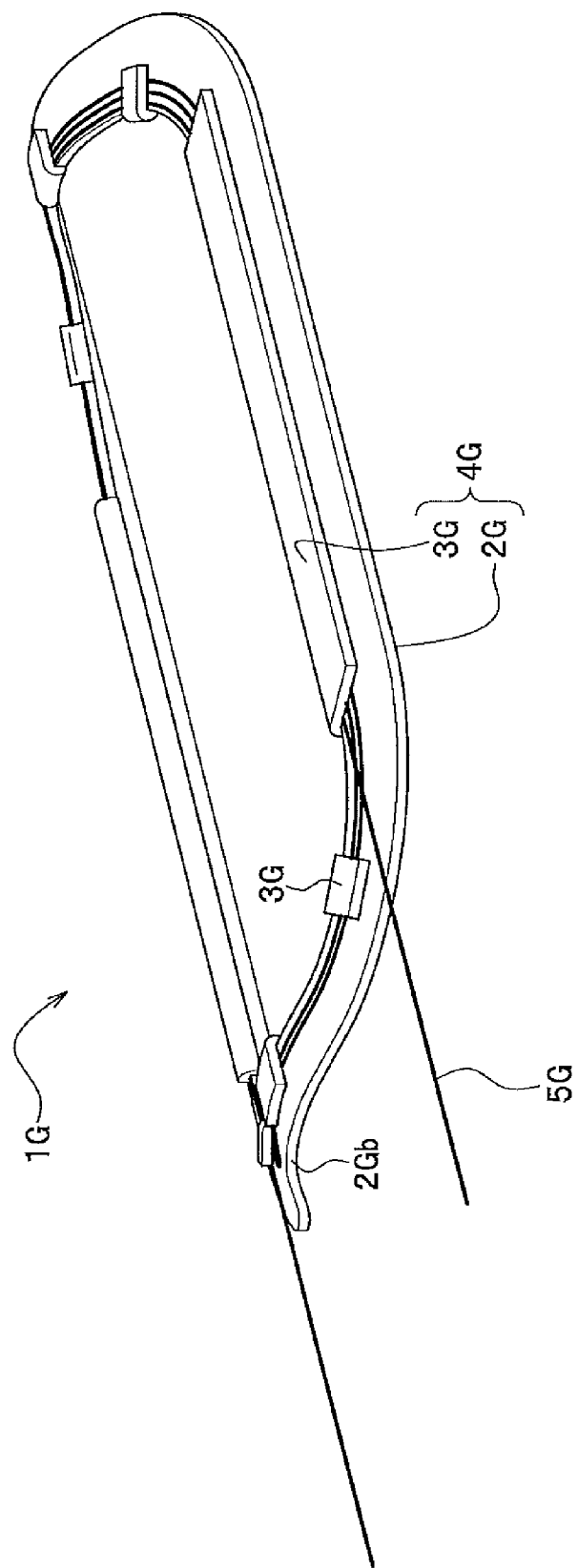
FIG. 18 is a perspective view of a superconducting coil for a sixth modified example.

FIG. 18 is a perspective view of a superconducting coil for a sixth modified example. Each indicated number in this modified example is common to the first embodiment.

The superconducting coil 1G as shown in FIG. 18 is a further modified example from the superconducting coil 1F for the fifth example, a saddle shaped superconducting coil (See FIG. 12) and has the second support member 2G having a curved plane 2Gb. This feature is not found in the superconducting coil 1F for the fifth modified example (See FIG. 12).

Figure 19:
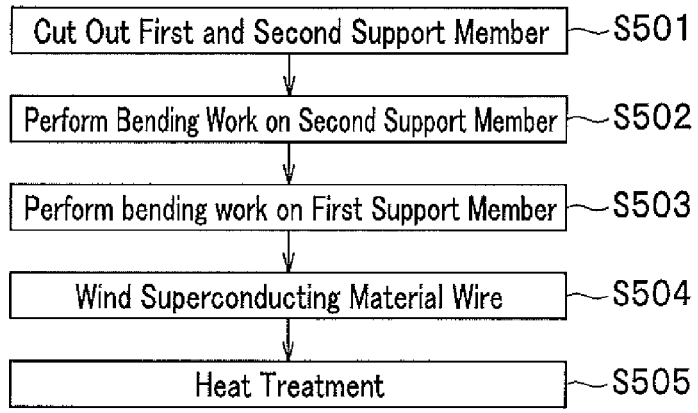
FIG. 19 is a flow chart showing production steps of the superconducting coil for the sixth modified example.

FIG. 19 is a flow chart showing production steps of the superconducting coil for the sixth modified example. FIGS. 20A, 20B, 20C and 20D are plan views of intermediate products each of which is produced after one or more production steps of the superconducting coil for the sixth modified example.

Figure 20A:
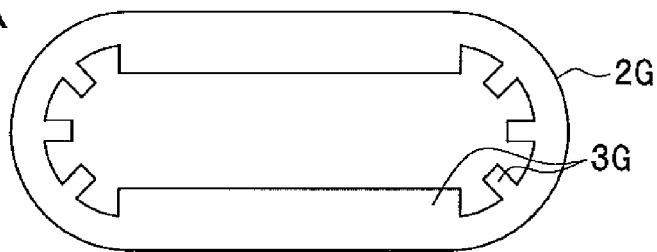
FIGS. 20A, 20B, 20C and 20D are plan views of intermediate products each of which is produced after one or more production steps of the superconducting coil for the sixth modified example.

At step S501, the first support member 2G and the second support member 3G are cut out as an integral member from a metal plate as shown in FIG. 20A. At step S502, the second support member 3G, which is divided into a plurality of support pieces, is bent and folded back to have a surface of the second support member 3G and a surface of the first support member 2G face each other as shown in FIG. 20B.

Figure 20B:
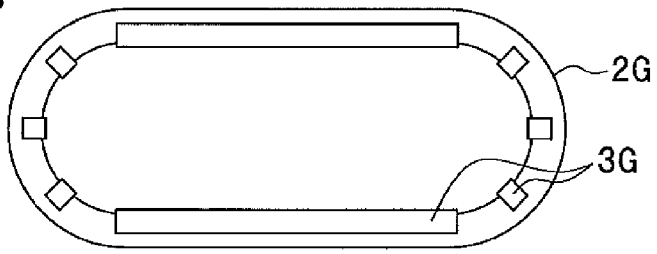
Figure 20C:
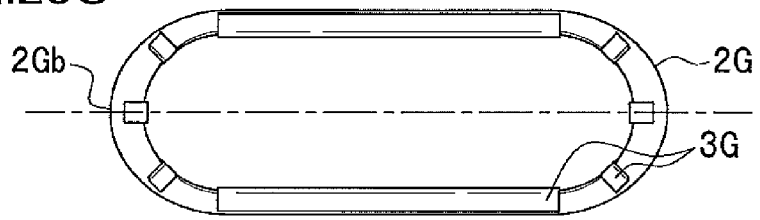
Figure 20D:
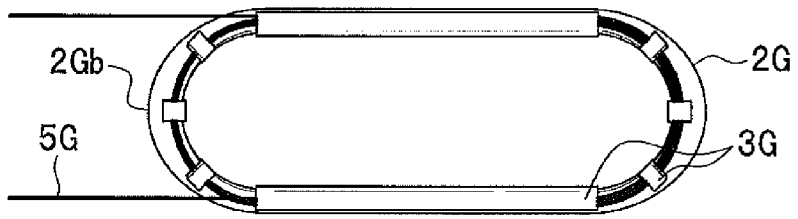

At step S503, the first support member 2G integrally combined with the second support member 3G is bent to be a curved plane 2Gb that is symmetrical with respect to a dashed line as a center line for bending work as indicated in FIG. 20C and to be a coil frame 4G in a saddle shape. The center line for bending work is in parallel with the linear portions of the race track shape. A vertical plane inclusive of the center line to the first support member 2G is a mirror symmetry plane for the first support member 2G. In order to prevent the curved portion of the first support member 2G in a race track shape from interfering with the rotor, the curvature radius of the curved plane 2Gb ought to be smaller than the outer radius of the rotor.

At step S504, a superconducting material wire 5G to be a superconducting wire 5G is wound about the coil frame 4G produced at step S503 as shown in FIG. 20B. At step S505, the whole coil frame 4G is put in a furnace and the superconducting material wire 5G is heat treated (final heat treatment). It does not make a significant difference if the superconducting material wire 5G is wound about the coil frame 4G before the coil frame 4G is bent to be in the saddle shape with the step S504 being carried out ahead of the step 503, because the superconducting property of the superconducting material wire 5G does not deteriorate as long as the superconducting material wire 5G is bent before the heat treatment in step S505.

As explained above, the superconducting coil 1G for the sixth modified example as shown in FIG. 18 is produced.

Next, an explanation is given on an example of the superconducting coil 1G for the sixth modified example being used for a stator coil on a superconducting rotating machine. An explanation that is the same as that on the superconducting rotating machine 10 (See FIG. 13) is skipped.

Figure 21:
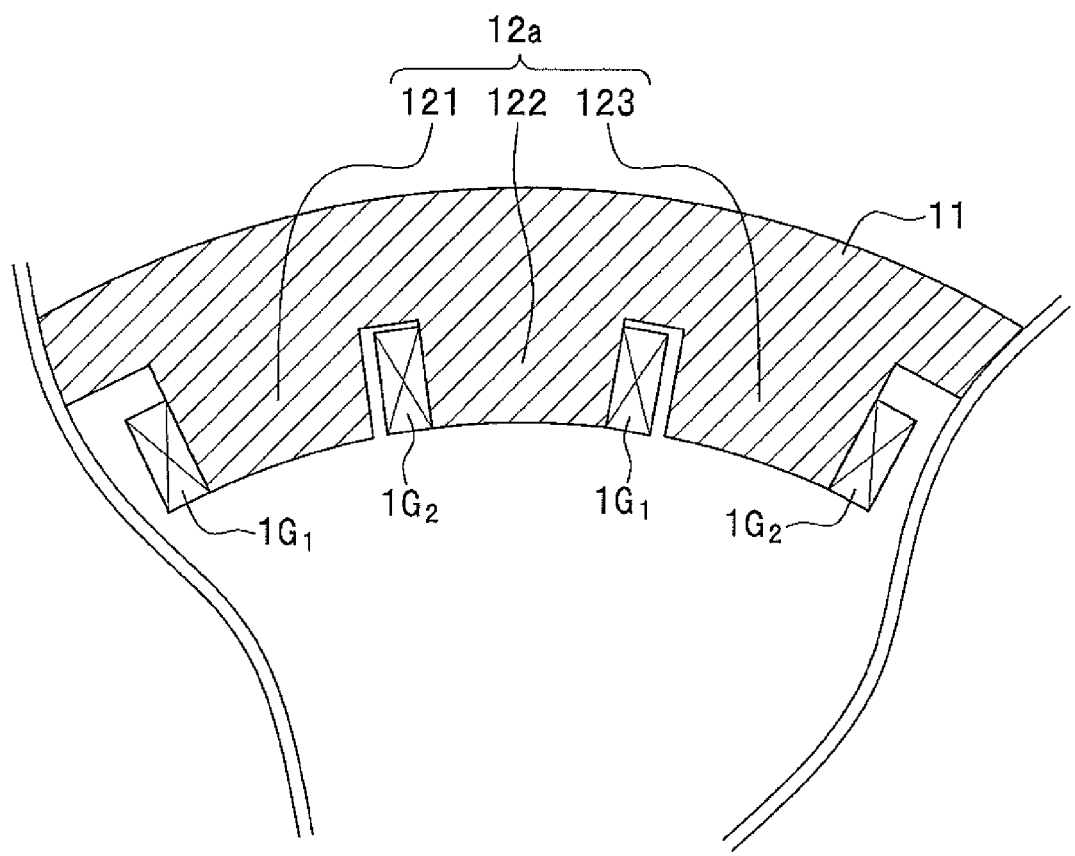
FIG. 21 is an enlarged cross sectional view of a superconducting rotating machine as viewed in the direction of a rotation axis of a rotor.
Figure 21:

FIG. 21 is an enlarged cross sectional view of a superconducting rotating machine as viewed in the direction of a rotation axis of a rotor.

Teeth 12a on one side of U phase are constituted by teeth 121, 122, 123. There are a couple of superconducting coils $1G_1$, $1G_2$ attached for the teeth 12a. The superconducting coil $1G_1$ is attached to enclose the teeth 121, 122 while the superconducting coil $1G_2$ is attached to enclose the teeth 122, 123. The superconducting coils $1G_1$, $1G_2$ are electrically connected in series or parallel with each other. Tooth 12d on the other side of U phase have the same structure as the teeth 12a. Each of teeth of U phase and V phase (12b, 12c, 12e, 12f) has the same structure as the teeth 12a as well.

The superconducting coils $1G_1$, $1G_2$ are disposed as explained above and form distributed windings in which part of the superconducting coils $1G_1$ is disposed overlapped with part of the superconducting coils $1G_2$. As a result, a waveform of magnetomotive force generated by this stator 11 is made to be closer to a sinusoidal wave. A detailed explanation on the waveform of magnetomotive force on the distribution windings becoming closer to a sinusoidal wave is given in "Schematic Explanation on Induction Generator", written by Shigehiko TSUBOJIMA and published in 2006 by Tokyo Denki University Press, and skipped.

Figure 22:
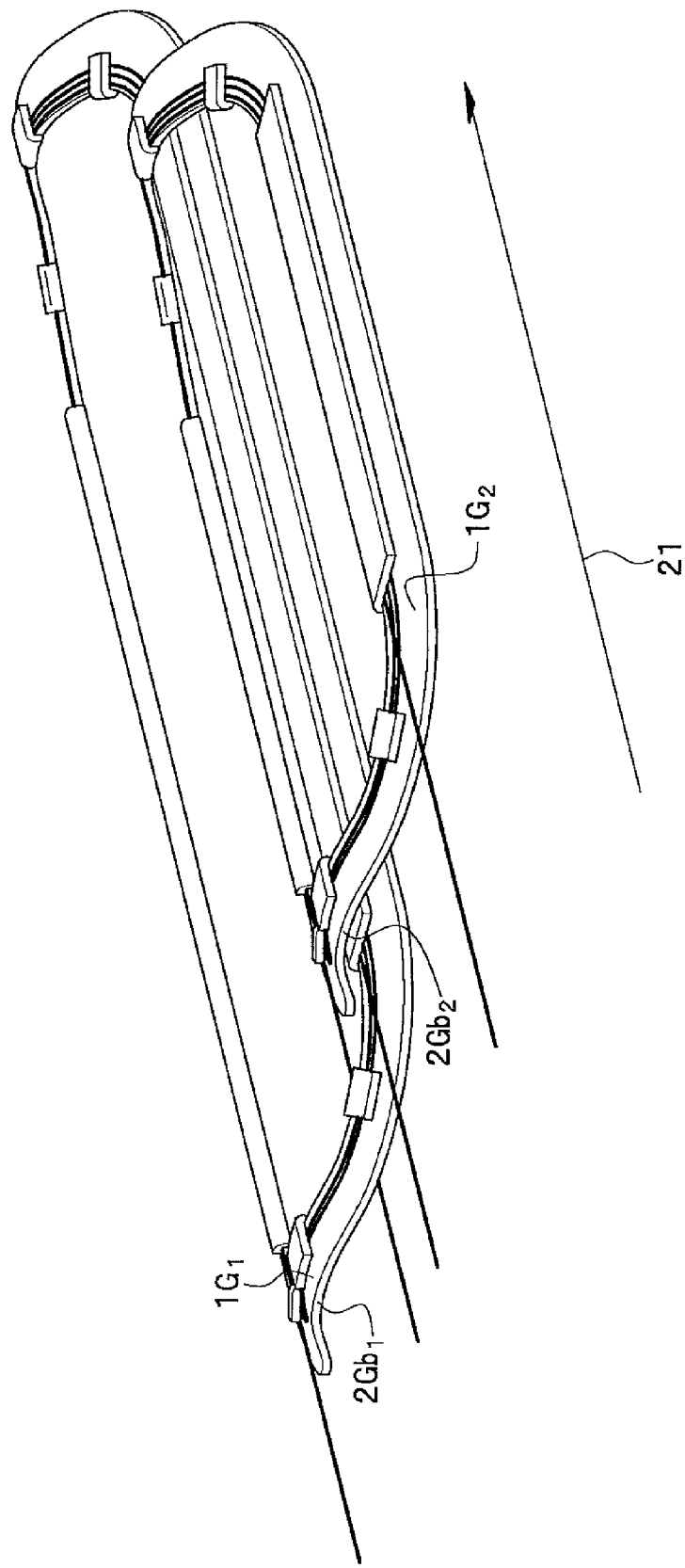
FIG. 22 is a perspective view of the superconducting coil in FIG. 21.

FIG. 22 is a perspective view of the superconducting coil in FIG. 21

A couple of superconducting coils $1G_1$, $1G_2$, used for the superconducting rotating machine is shown in FIG. 22. Both of these superconducting coils are in a race track shape and a saddle shape. Between these superconducting coils there is a difference in the length of the linear portions and the superconducting coil $1G_2$ has a shorter linear portion than the superconducting coil $1G_1$ and is disposed over and across one of the linear portions of the superconducting coil $1G_1$. Since the superconducting coil $1G_2$ is in a shape of a curved plane $2Gb_2$, it is possible to dispose the superconducting coil $1G_2$ over and across one of the linear portions of the superconducting coil $1G_1$ without having the superconducting coil $1G_2$ interfering with the linear portion of the superconducting coil $1G_1$. Moreover, since the superconducting coil $1G_1$ is in a shape of a curved plane $2Gb_1$, both superconducting wires of the superconducting coils $1G_1$, $1G_2$ can be drawn to one of sides of these superconducting coils. Thus, it is possible to dispose a couple of the superconducting coils $1G_1$, $1G_2$ without having them interfering with each other, if the superconducting coils $1G_1$, $1G_2$ are disposed partially overlapped with each other to form distribution windings.

According to the superconducting coil of the present invention and the superconducting rotating machine using the superconducting coil, the superconducting coil whose shape can be changed after a coil is formed and the superconducting rotating machine using the superconducting coil are provided. Moreover this superconducting coil is attached to a stator tooth regardless of the shape of the stator tooth.

What is claimed is:

1. A superconducting coil comprising:
  a superconducting material wire coated with an insulation material and;
  a coil frame on which the superconducting material wire is wound, the coil frame comprising a first member which comprises a thin plate in a ring shape and includes a pair of straight portions, and a second member jointed with a first inner periphery portion of the first member, the second member extending from the jointed portion with the first member toward an outer periphery of the first member,
  wherein the first member includes a curved joint portion which connects the pair of the straight portions and which is bent to form a curved plane with a three-dimensional shape, and
  wherein the superconducting material wire is wound between the first member and the second member, which constitute the coil frame, and the wound superconducting material wire is shaped in accordance with the ring shape of the first member.

2. The superconducting coil as described in claim 1, wherein the second member is a thin plate in a ring shape having a second inner periphery portion being capable of being aligned with the first inner periphery portion of the first member, and the second inner periphery portion is jointed with the first member with the second inner periphery portion jointed with the first inner periphery portion.

3. The superconducting coil as described in claim 1, wherein the second member is divided into a plurality of pieces.

4. The superconducting coil as described in claim 1, wherein the coil frame becomes a single thin flat plate with the second member disposed inside the first member if the coil frame is developed with the second member being straightened.

5. The superconducting coil as described in claim 1, wherein the first member is in a race track shape.

6. The superconducting coil as described in claim 1, wherein the coil frame is made of a stainless steel.

7. The superconducting coil as described in claim 1, wherein both the first member and the second member are less than or equal to 0.5 mm in thickness.

8. The superconducting coil as described in claim 1, wherein the superconducting material wire is a round wire.

9. The superconducting coil as described in claim 1, wherein the superconducting material wire includes magnesium diboride.

10. The superconducting coil as described in claim 1, wherein the superconducting material wire is impregnated with a resin having a high thermal conductivity.

11. A superconducting rotating machine comprising:
  a stator having a plurality of superconducting coils as described in claim 1 and a stator frame; and
  a rotor having a magnetic material or a conductor,
  wherein the plurality of superconducting coils are disposed on an inner circumference of the stator frame as viewed in a direction of a rotation axis of the rotor.

12. The superconducting rotating machine as described in claim 11, wherein at least a couple of the superconducting coils are wound on each of opposite teeth for each phase, and include adjacent superconducting coils for the each phase are disposed partially overlapped with each other as viewed in the direction of the rotation axis of the rotor,
  wherein, for each pair of adjacent superconducting coils for each phase, a first one of the pair of adjacent superconducting coils has a shorter linear portion in the direction of the rotation access of the rotor than a linear portion in the direction of the rotation access of the rotor of a second one of the pair of adjacent superconducting coils.

13. The superconductor rotating machine as described in claim 11,
  wherein at least a pair of the superconducting coils are wound on each of opposite teeth for each phase, and first straight portions of one of adjacent superconducting coils of the pair of the superconducting coils for each phase are longer than second straight portions of the other of the adjacent superconducting coils; and wherein the other of the adjacent superconducting coils having the second straight portions is disposed being partially overlapped within the one of the adjacent superconducting having the first straight portions.

14. The superconducting rotating machine as described in claim 13, wherein the curved joint portion of the other of the adjacent superconducting coils having the second straight portions is disposed above the first straight portions of the one of adjacent superconducting coils.

* * * * *